United States Patent [19]
DeHoff

[11] 4,067,353
[45] Jan. 10, 1978

[54] PIPELINE TAP AND CONNECTING DEVICE

[75] Inventor: Robert Eugene DeHoff, Mount Joy, Pa.

[73] Assignee: AMP Incorporated, Harrisburg, Pa.

[21] Appl. No.: 727,549

[22] Filed: Sept. 28, 1976

[51] Int. Cl.$^2$ .............................................. F16K 43/00
[52] U.S. Cl. .................................... 137/318; 138/92; 138/94; 285/150; 285/197; 408/102
[58] Field of Search .................... 137/15, 315, 318; 138/92, 94, 99, 103; 285/197, 198, 199, 256; 408/87, 102, 104, 150

[56] References Cited
U.S. PATENT DOCUMENTS

| 3,240,226 | 3/1966 | Burkholder | 137/318 |
| 3,674,292 | 7/1972 | Demler, Sr. | 285/256 |
| 3,756,261 | 9/1973 | Minchhoff | 137/15 |
| 3,971,573 | 7/1976 | Clements | 285/150 |

Primary Examiner—Martin P. Schwadron
Assistant Examiner—G. L. Walton
Attorney, Agent, or Firm—Allan B. Osborne

[57] ABSTRACT

An invention relating to a device adapted to connect a branch line to a main pipeline without interrupting flow of fluid through the mainline. The device includes a pair of tubular, cutter-containing portions and a branch line connection. The device further includes the means to pressure test the branch line prior to the actual cutting or tapping into the mainline.

3 Claims, 2 Drawing Figures

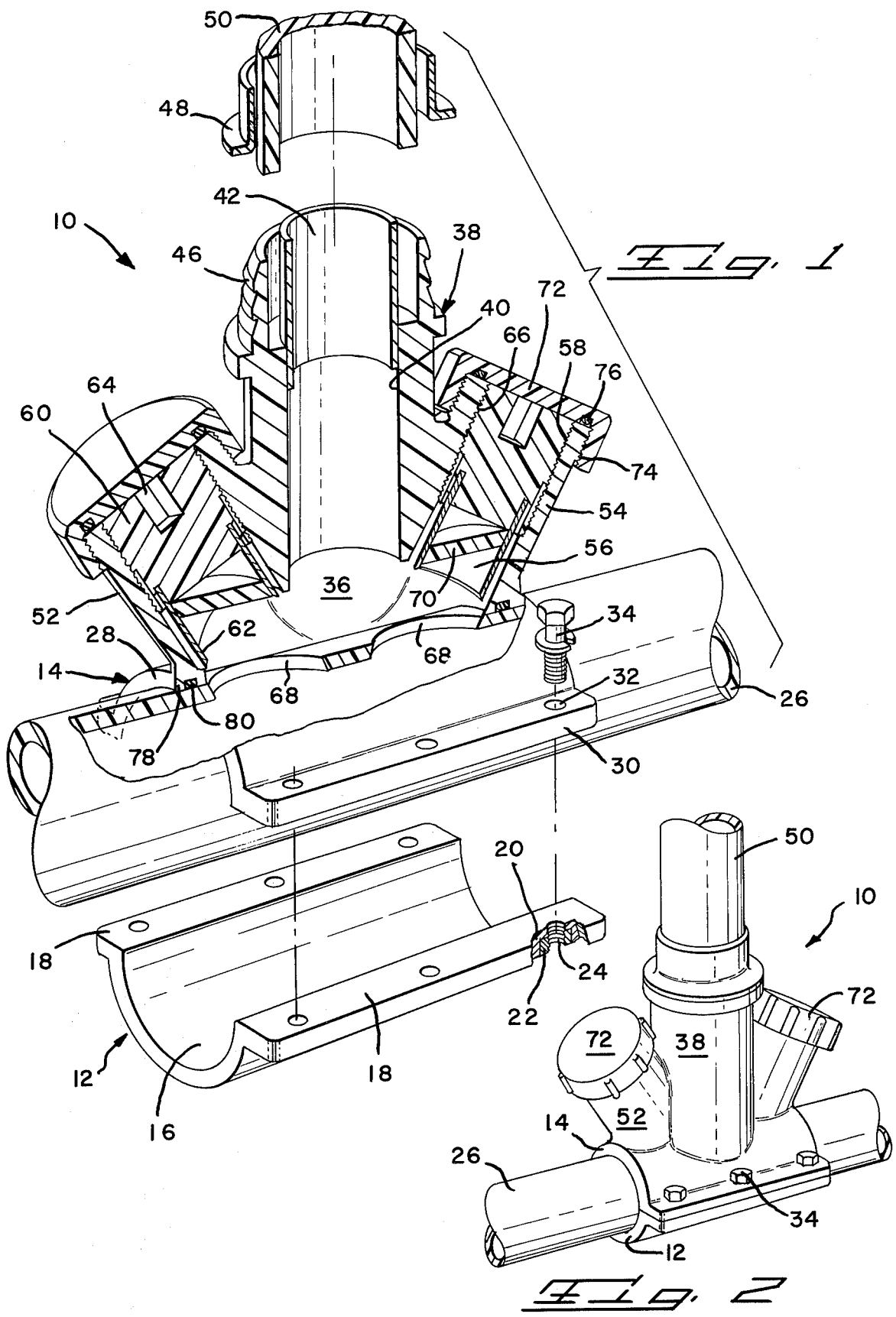

PIPELINE TAP AND CONNECTING DEVICE

BACKGROUND OF THE INVENTION

1. Field of the Invention

The present invention is related to small diameter main pipelines and more particularly to connecting branch lines or laterals to the mainline without interrupting the flow of fluid therethrough.

2. Prior Art

U.S. Pat. No. 3,756,261 exemplifies the prior art relating to devices adapted to tap into a preexisting pipeline so that a secondary or branch line can be connected thereto. These devices operate without the need to interrupt the fluid flow through the pipeline.

SUMMARY OF THE INVENTION

The present invention consists of two half shells which are clamped about a pipeline. One half shell has three tubes extending laterally therefrom with two tubes containing means to cut holes in the pipeline. The two holes communicate with a passage in the third tube onto which a branch line may be connected.

BRIEF DESCRIPTION OF THE DRAWINGS

FIG. 1 is a cross-sectional view of the device of the present invention; and

FIG. 2 is a perspective view of the device of FIG. 1.

DESCRIPTION OF THE PREFERRED EMBODIMENT

With reference to both figures, device 10 which may be molded from plastic, includes two half shells 12 and 14. Half shell 12 consists of an arcuate or elongated half round wall 16 and flanges 18 extending along each side of the wall Flanges 18 may have a number of apertures 20 therethrough. In the embodiment shown metal hollow inserts 22 having inner threads 24 are fixed in the apertures to form part of a fastening means.

The arcuate shape of the half shells conform to the cylindrical shape of the pipeline 26 onto which the device is fixed.

Half shell 14 consists of an arcuate wall 28 and laterally extending flanges 30. Apertures 32 through the flanges receive threaded bolts 34, thus completing a fastening means by which the two half shells 12 and 14 are secured together about pipeline 26 as shown in FIG. 2.

An elongated opening 36 through arcuate wall 28 underlies a trio of tubes projecting laterally from wall 28.

Tube 38 is perpendicular to the longitudinal axis of the half shell and contains passage 40. A metal bushing 42, the annular rim 44, beveled serrations 46 and flange 48 are the elements which connect branch line 50 to the tube. These connecting elements are disclosed in U.S. Pat. No. 3,674,292 and do not form any part of the novelty herein.

Tubes 52 and 54, both smaller than tube 38, angle away from the half shell as shown. Both tubes have a passage 56, the upper portion of which contains threads 58. The passages 56 merge into the elongated opening 36 along with passage 40 of tube 38.

Each of the small tubes, 52 and 54, contain pipe cutting apparatus which consists of a ram 60 and a cylindrical cutter 62. The ram has a hexagonal recess 64 on its upper surface and exterior threads 66 on its upper portion which mate with threads 58 on the inside surface of tubes 52 and 54. The recess receives an allen wrench by means of which the cutter apparatus is advanced whereby cutters 62 may cut holes 68 into pipeline 26. In FIG. 1 holes 68 have been cut and the cutter apparatus withdrawn back up into tubes 52 and 54. The pieces of pipe 70 cut out, called coupons, are wedged into the cylindrical cutters 62 and are also withdrawn. Caps 72 are secured over the open ends of tubes 52 and 54 by means of threads 74. O-rings 76 in the caps provide a seal.

The inside surface of arcuate wall 28 has a groove 78 circumventing opening 36. An O-ring 80 positioned therein provides a seal between the half shell and pipelines to environmentally protect fluids which may flow from pipeline 26 into branch line 50 through holes 68 and opening 36.

Device 10 is installed onto the pipeline 26 by placing the two half shells, 12 and 14, around the pipe and fastening them together by means of bolts 34 or other fastening means. The tightening of the bolts compresses O-ring 80 into a sealing relation between the pipe and arcuate wall.

Branch line 50 may now be connected to tube 38 and if desired, pressure tested. For such testing the cutting apparatus may be withdrawn from one small tube, 52 or 54 for installing of a pressure gauge.

Subsequent to the pressure test, the cutter apparatus may now cut out holes 68 and caps 72 placed over the ends after withdrawing the cutter and coupon. Fluid (not shown) in the pipeline may now flow through holes 68, opening 36 and into branch line 50 via passage 40.

One modification which may be utilized is to replace the elongated opening 36 with a pair of smaller annular openings (not shown), each of such being in alignment with the cutting apparatus in tubes 52 and 54.

The foregoing detailed description has been given for clearness of understanding only, and no unnecessary limitations should be understood therefrom, as some modifications will be obvious to those skilled in the art.

What is claimed is:

1. A device for tapping into a pipeline and for providing a branch line connection thereon, which comprises:
   a. a first elongated half shell comprising an arcuate wall and laterally projecting flanges along each side of the wall, and an opening through the wall, said first half shell adapted to be positioned longitudinally onto a pipeline;
   b. a second elongated half shell comprising an arcuate wall and laterally projecting flanges along each side of the wall, said second half shell adapted to be positioned longitudinally onto a pipeline in alignment with the first half shell whereby the flanges may be fastened together thereby clamping the first and second half shells around the pipeline;
   c. first, second and third passage-containing tubes integral with and projecting laterally from the arcuate wall of the first half shell, the first tube being perpendicular to the wall and the second and third tubes being at angles thereto, said passages merging at the opening in the arcuate wall; and
   d. cutting means movably positioned in the second and third tubes for cutting holes into the pipeline through the arcuate wall opening to allow communication from the interior of the pipeline to the passage in the first tube.

2. The device of claim 1 further including sealing means on the inside surface of the arcuate wall of the first shell surrounding the opening for providing a seal between the first half shell and pipeline.

3. The device of claim 1 further including means to connect a branch line to the first tube.

* * * * *